United States Patent
Wybenga et al.

(10) Patent No.: US 7,733,857 B2
(45) Date of Patent: Jun. 8, 2010

(54) APPARATUS AND METHOD FOR SHARING VARIABLES AND RESOURCES IN A MULTIPROCESSOR ROUTING NODE

(75) Inventors: Jack C. Wybenga, Plano, TX (US); Patricia K. Sturm, Marion, IA (US); Yingwei Wang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1499 days.

(21) Appl. No.: 11/015,738

(22) Filed: Dec. 17, 2004
(Under 37 CFR 1.47)

(65) Prior Publication Data
US 2006/0133389 A1    Jun. 22, 2006

(51) Int. Cl.
H04L 12/28 (2006.01)
H04L 12/56 (2006.01)
(52) U.S. Cl. ...................................... 370/389
(58) Field of Classification Search ................. 370/498, 370/351, 401, 398, 389, 386, 236, 246, 419, 370/428, 388, 395, 400; 709/249, 219, 203, 709/220, 238, 245, 247, 201, 221; 713/246, 713/164, 176; 455/445; 714/4; 712/11, 712/34, 32, 220, 225, 229, 228; 711/141; 375/371; 718/100, 107, 104
See application file for complete search history.

(56) References Cited

U.S. PATENT DOCUMENTS

| | | | | |
|---|---|---|---|---|
| 3,692,989 A | | 9/1972 | Kandiew | |
| 4,875,224 A | * | 10/1989 | Simpson | 375/371 |
| 5,689,506 A | * | 11/1997 | Chiussi et al. | 370/388 |
| 5,987,586 A | * | 11/1999 | Byers | 712/11 |
| 6,985,483 B2 | * | 1/2006 | Mehrotra et al. | 370/389 |
| 7,082,104 B2 | * | 7/2006 | Wolrich et al. | 370/236 |
| 7,107,329 B1 | * | 9/2006 | Schroder et al. | 709/221 |
| 7,295,561 B1 | * | 11/2007 | Yao et al. | 370/400 |
| 7,302,549 B2 | * | 11/2007 | Wilkinson et al. | 712/32 |
| 7,437,724 B2 | * | 10/2008 | Wolrich et al. | 718/100 |
| 7,474,661 B2 | * | 1/2009 | Sturm et al. | 370/395.31 |
| 2001/0056553 A1 | * | 12/2001 | Suzuki et al. | 714/4 |
| 2002/0026502 A1 | * | 2/2002 | Phillips et al. | 709/219 |
| 2003/0041216 A1 | * | 2/2003 | Rosenbluth et al. | 711/141 |
| 2004/0249803 A1 | * | 12/2004 | Vankatachary et al. | 707/3 |
| 2005/0010761 A1 | * | 1/2005 | Remedios et al. | 713/164 |
| 2005/0063407 A1 | * | 3/2005 | Wybenga et al. | 370/428 |
| 2005/0232264 A1 | * | 10/2005 | Wybenga et al. | 370/389 |
| 2005/0265307 A1 | * | 12/2005 | Wybenga et al. | 370/351 |
| 2005/0268072 A1 | * | 12/2005 | Najam et al. | 712/34 |
| 2006/0126512 A1 | * | 6/2006 | Jain et al. | 370/236 |
| 2006/0133389 A1 | * | 6/2006 | Wybenga et al. | 370/401 |

* cited by examiner

*Primary Examiner*—Hong Cho
*Assistant Examiner*—Prenell P Jones (57) ABSTRACT

A router for transferring data packets between external devices. The router comprises: 1) a switch fabric; and 2) R routing nodes coupled to the switch fabric. Each routing node exchanges data packets with the external devices and with other routing nodes via the switch fabric. A first routing node comprises: i) an inbound network processor comprising a first plurality of microengines capable of forwarding incoming data packets from external ports to the switch fabric; ii) an outbound network processor comprising a second plurality of microengines capable of forwarding outgoing data packets from the switch fabric to the external ports; and iii) an asynchronous variables circuit for controlling access of the inbound and outbound network processors to at least one of i) a shared resource and ii) a shared variable in the router.

20 Claims, 6 Drawing Sheets

APPARATUS AND METHOD FOR SHARING VARIABLES AND RESOURCES IN A MULTIPROCESSOR ROUTING NODE

TECHNICAL FIELD OF THE INVENTION

The present invention is generally directed to distributed architecture routers and, in particular, to a technique for sharing variables and resources in a multiprocessor environment.

BACKGROUND OF THE INVENTION

There has been explosive growth in Internet traffic due to the increased number of Internet users, various service demands from those users, the implementation of new services, such as voice-over-IP (VoIP) or streaming applications, and the development of mobile Internet. Conventional routers, which act as relaying nodes connected to sub-networks or other routers, have accomplished their roles well, in situations in which the time required to process packets, determine their destinations, and forward the packets to the destinations is usually smaller than the transmission time on network paths. More recently, however, the packet transmission capabilities of high-bandwidth network paths and the increases in Internet traffic have combined to outpace the processing capacities of conventional routers.

This has led to the development of massively parallel, distributed architecture routers. A distributed architecture router typically comprises a large number of routing nodes that are coupled to each other via a plurality of switch fabric modules and an optional crossbar switch. Each routing node has its own routing (or forwarding) table for forwarding data packets via other routing nodes to a destination address.

The Applicants have filed a number of patent applications related to a massively parallel, distributed architecture router in which each of the multiple routing nodes uses two processors—an inbound network processor and an outbound network processor—to forward data packets. The inbound network processor receives data packets from external devices and forwards the received data packets to other routing nodes via the switch fabric and crossbar switch. The outbound network processor receives data packets from the switch fabric and crossbar switch and forwards the received data packets to an external device.

The disclosed inbound and outbound network processors comprise multiple microengines that perform route searches in a shared forwarding table. In an exemplary embodiment, each inbound or outbound network processor comprises a control plane processor (e.g., XScale core processor (XCP)) operating in the control plane and sixteen (16) microengines that route data packets in the data plane. In such an embodiment, the control plane processors of the inbound and outbound network processors perform control plane communications primarily using Local Processor Communications (LPC) over a PCI bus. Also, mechanisms are available inside each network processor to provide internal communications among microengines and control plane processors inside the same network processor.

The routers previously described by the Applicants distribute the control plane processing and data plane processing across many processors, microengines, processes, and threads. These processing entities must coordinate operations, as well as share variables and hardware resources. Traditional methods of sharing variables and resources include using software semaphores and time-partitioning techniques. However, software semaphores are complex, error-prone, and consume a large amount of system resources. Time-partitioning may not be practical and it is often difficult to maintain synchronization. Additionally, conventional techniques for sharing resources require a specialized programming model that departs from standard Von Neuman programming.

Therefore, there is a need in the art for an improved high-speed router that implements multiprocessor routing nodes that are capable of sharing variables and hardware resources without relying on software semaphores. There is a further need for an improved high-speed router that implements multiprocessor routing nodes that are capable of sharing variables and hardware resources without relying on time partitioning techniques. More particularly, there is need for an improved high-speed router that implements multiprocessor routing nodes without departing from standard Von Neuman processing techniques.

SUMMARY OF THE INVENTION

The present invention provides a mechanism for sharing resources and variables by using asynchronous (or "async") variables in a multiprocessor routing node. Asynchronous variables provide a way to allow custom hardware (e.g., FPGA functions) to control access to these resources, thereby freeing router software from the task of dealing with the complexities and processing cycles associated with software semaphores. The high throughput of forwarding packets at 10 Gbps requires that a fast, efficient mechanism that has little impact on the microengines processing the data traffic be used to control these resources. The use of asynchronous variables also allows a conventional Von Neuman programming model to be used in a multi-processor environment.

The present invention introduces the use of asynchronous variables with hardware-controlled protected mode and unprotected mode operations. The present invention introduces the use of asynchronous variables as a method of controlling shared resources, the use of asynchronous variables as a controlled resource, and the use of asynchronous variables as a fault detection mechanism.

Accordingly, to address the above-discussed deficiencies of the prior art, it is a primary object of the present invention to provide a router for transferring data packets between external devices coupled to the router. According to an advantageous embodiment of the present invention, the router comprises: 1) a switch fabric; and 2) R routing nodes coupled to the switch fabric. Each of the R routing nodes is capable of exchanging data packets with the external devices and with other ones of the R routing nodes via the switch fabric. A first of the R routing nodes comprises: i) an inbound network processor comprising a first plurality of microengines capable of forwarding incoming data packets from external ports to the switch fabric; ii) an outbound network processor comprising a second plurality of microengines capable of forwarding outgoing data packets from the switch fabric to the external ports; and iii) an asynchronous variables circuit for controlling access of the inbound and outbound network processors to at least one of i) a shared resource and ii) a shared variable in the router.

According to one embodiment of the present invention, the asynchronous variables circuit is implemented in a shared memory structure accessible by the inbound and outbound network processors.

According to another embodiment of the present invention, the shared memory structure comprises a field programmable gate array.

According to still another embodiment of the present invention, the asynchronous variables circuit comprises a first register for storing a first data value associated with a first shared variable.

According to yet another embodiment of the present invention, the asynchronous variables circuit further comprises a second register capable of storing control and status bits that control read access and write access to first data value in the first register.

According to a further embodiment of the present invention, the control and status bits comprise a full flag and an empty flag capable of indicating whether a state of the first data value in the first register is one of: i) uninitialized; ii) empty; iii) full, and iv) undefined.

According to a still further embodiment of the present invention, the first data value may not be read in a protected mode when the full flag and empty flag indicate that the first data value is in an empty state.

According to a yet further embodiment of the present invention, the first data value may not be written in a protected mode when the full flag and empty flag indicate that the first data value is in a full state.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged packet switch or router.

Figure 1:
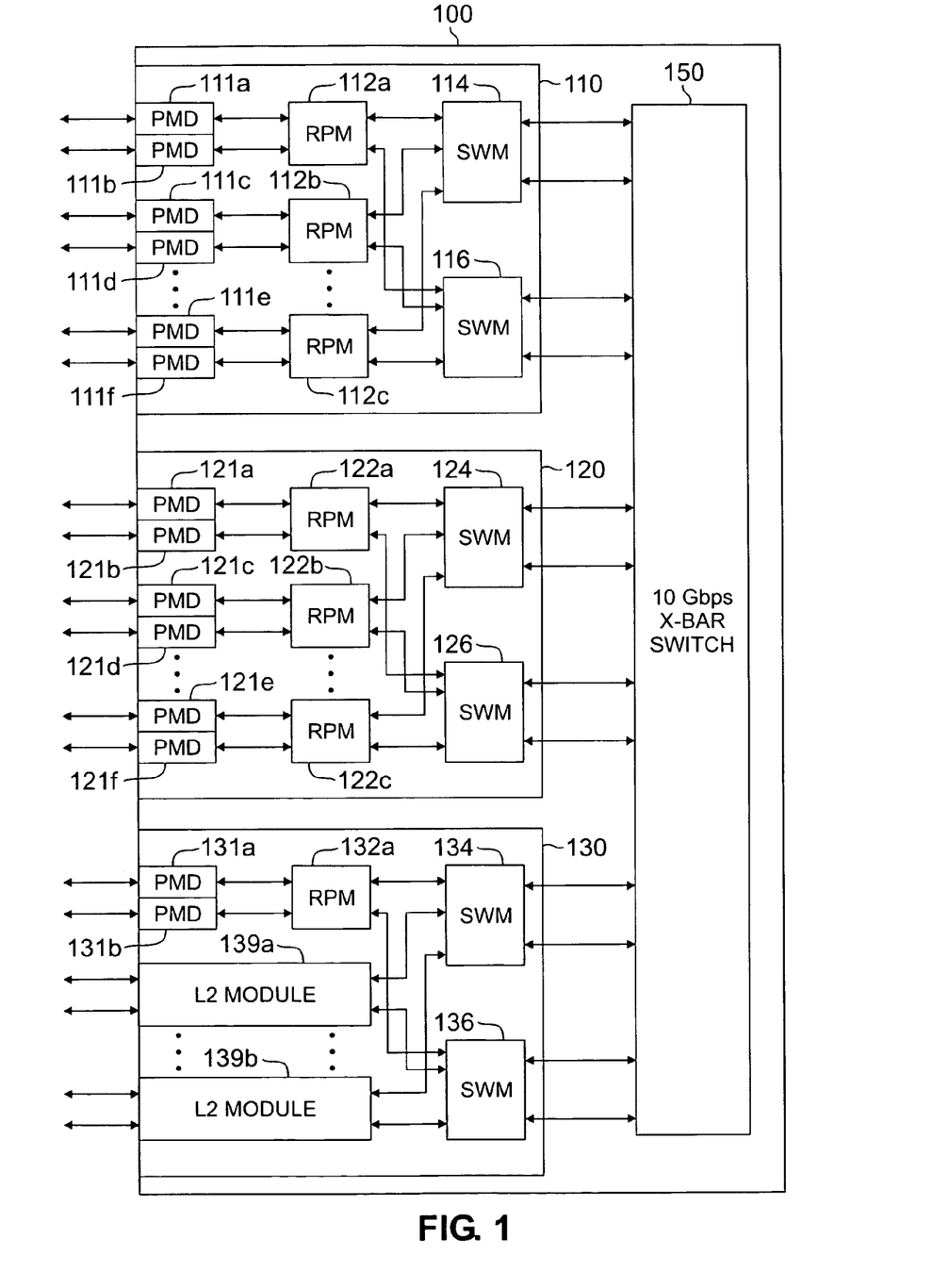
FIG. 1 illustrates an exemplary distributed architecture router that uses asynchronous variables to share resources according to the principles of the present invention.

FIG. 1 illustrates exemplary distributed architecture router 100, which uses asynchronous variables to share resources according to the principles of the present invention. Router 100 supports Layer 2 switching and Layer 3 switching and routing. Thus, router 100 functions as both a switch and a router. However, for simplicity, router 100 is referred to herein simply as a router. The switch operations are implied.

According to the exemplary embodiment, router 100 comprises N rack-mounted shelves, including exemplary shelves 110, 120 and 130, which are coupled via crossbar switch 150. In an advantageous embodiment, crossbar switch 150 is a 10 Gigabit Ethernet (10 GbE) crossbar operating at 10 gigabits per second (Gbps) per port.

Each of exemplary shelves 110, 120 and 130 may comprise route processing modules (RPMs) or Layer 2 (L2) modules, or a combination of route processing modules and L2 modules. Route processing modules forward data packets using primarily Layer 3 information (e.g., Internet protocol (IP) addresses). L2 modules forward data packets using primarily Layer 2 information (e.g., medium access control (MAC) addresses). For example, the L2 modules may operate on Ethernet frames and provide Ethernet bridging, including VLAN support. The L2 modules provide a limited amount of Layer 3 forwarding capability with support for small forwarding tables of, for example, 4096 routes.

In the exemplary embodiment shown in FIG. 1, only shelf 130 is shown to contain both route processing (L3) modules and L2 modules. However, this is only for the purpose of simplicity in illustrating router 100. Generally, it should be understood that many, if not all, of the N shelves in router 100 may comprise both RPMs and L2 modules.

Exemplary shelf 110 comprises a pair of redundant switch modules, namely primary switch module (SWM) 114 and secondary switch module (SWM) 116, a plurality of route processing modules 112, including exemplary route processing module (RPM) 112a, RPM 112b, and RPM 112c, and a plurality of physical media device (PMD) modules 111, including exemplary PMD modules 111a, 111b, 111c, 111d, 111e, and 111f. Each PMD module 111 transmits and receives data packets via a plurality of data lines connected to each PMD module 111.

Similarly, shelf 120 comprises a pair of redundant switch modules, namely primary SWM 124 and secondary SWM 126, a plurality of route processing modules 122, including RPM 122a, RPM 122b, and RPM 122c, and a plurality of physical media device (PMD) modules 121, including PMD modules 121a-121f. Each PMD module 121 transmits and receives data packets via a plurality of data lines connected to each PMD module 121.

Additionally, shelf 130 comprises redundant switch modules, namely primary SWM 134 and secondary SWM 136, route processing module 132*a*, a plurality of physical media device (PMD) modules 131, including PMD modules 131*a* and 131*b*, and a plurality of Layer 2 (L2) modules 139, including L2 module 139*a* and L2 module 139*b*. Each PMD module 131 transmits and receives data packets via a plurality of data lines connected to each PMD module 131. Each L2 module 139 transmits and receives data packets via a plurality of data lines connected to each L2 module 139.

Router 100 provides scalability and high-performance using up to M independent routing nodes (RN). A routing node comprises, for example, a route processing module (RPM) and at least one physical medium device (PMD) module. A routing node may also comprise an L2 module (L2M). Each route processing module or L2 module buffers incoming Ethernet frames, Internet protocol (IP) packets and MPLS frames from subnets or adjacent routers. Additionally, each RPM or L2M classifies requested services, looks up destination addresses from frame headers or data fields, and forwards frames to the outbound RPM or L2M. Moreover, each RPM (or L2M) also maintains an internal routing table determined from routing protocol messages, learned routes and provisioned static routes and computes the optimal data paths from the routing table. Each RPM processes an incoming frame from one of its PMD modules. According to an advantageous embodiment, each PMD module encapsulates an incoming frame (or cell) from an IP network (or ATM switch) for processing in a route processing module and performs framing and bus conversion functions.

Incoming data packets may be forwarded within router 100 in a number of different ways, depending on whether the source and destination ports are associated with the same or different PMD modules, the same or different route processing modules, and the same or different switch modules. Since each RPM or L2M is coupled to two redundant switch modules, the redundant switch modules are regarded as the same switch module. Thus, the term "different switch modules" refers to distinct switch modules located in different ones of shelves 110, 120 and 130.

In a first type of data flow, an incoming data packet may be received on a source port on PMD module 121*f* and be directed to a destination port on PMD module 131*a*. In this first case, the source and destination ports are associated with different route processing modules (i.e., RPM 122*c* and RPM 132*a*) and different switch modules (i.e., SWM 126 and SWM 134). The data packet must be forwarded from PMD module 121*f* all the way through crossbar switch 150 in order to reach the destination port on PMD module 131*a*.

In a second type of data flow, an incoming data packet may be received on a source port on PMD module 121*a* and be directed to a destination port on PMD module 121*c*. In this second case, the source and destination ports are associated with different route processing modules (i.e., RPM 122*a* and RPM 122*b*), but the same switch module (i.e., SWM 124). The data packet does not need to be forwarded to crossbar switch 150, but still must pass through SWM 124.

In a third type of data flow, an incoming data packet may be received on a source port on PMD module 111*c* and be directed to a destination port on PMD module 111*d*. In this third case, the source and destination ports are associated with different PMD modules, but the same route processing module (i.e., RPM 112*b*). The data packet must be forwarded to RPM 112*b*, but does not need to be forwarded to crossbar switch 150 or to switch modules 114 and 116.

Finally, in a fourth type of data flow, an incoming data packet may be received on a source port on PMD module 111*a* and be directed to a destination port on PMD module 111*a*. In this fourth case, the source and destination ports are associated with the same PMD module and the same route-processing module (i.e., RPM 112*a*). The data packet still must be forwarded to RPM 112*a*, but does not need to be forwarded to crossbar switch 150 or to switch modules 114 and 116.

Figure 2:
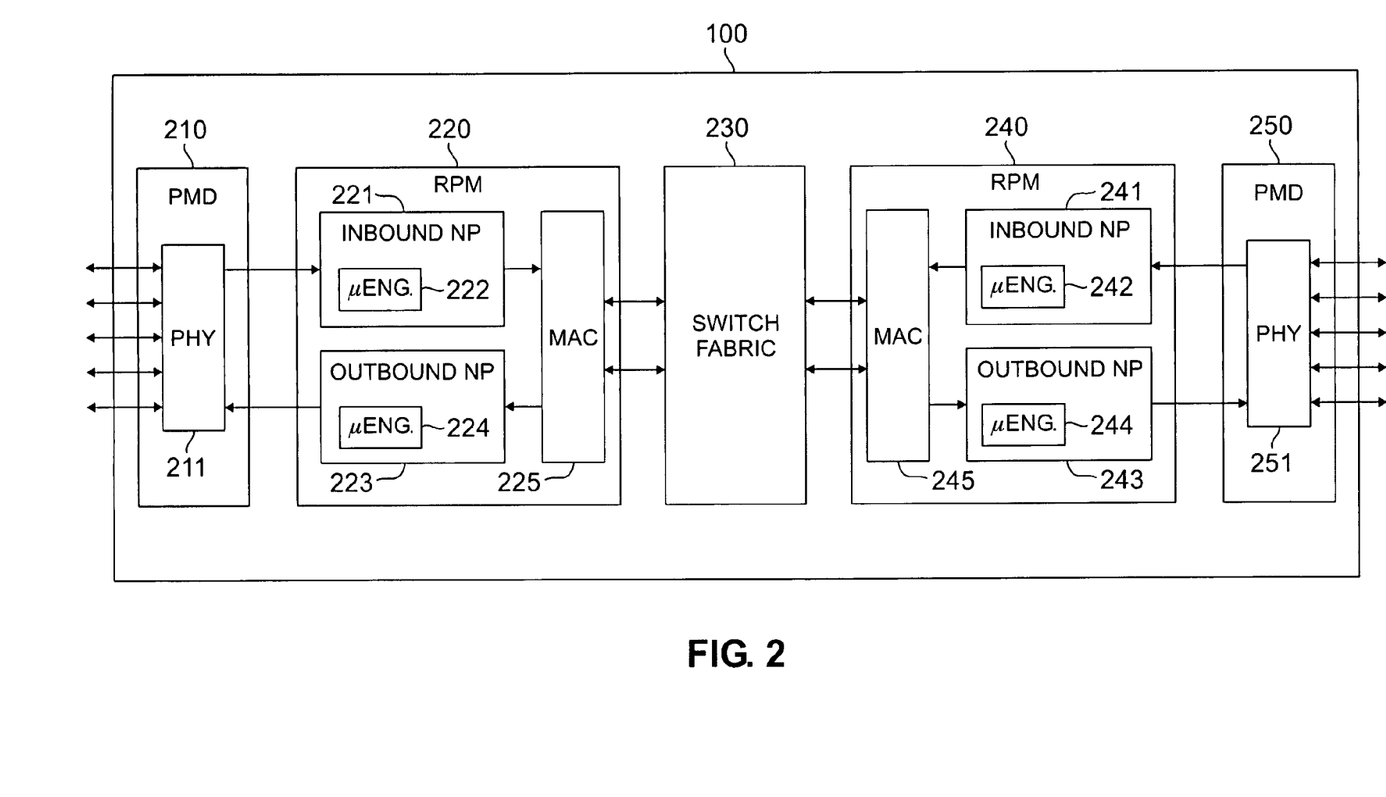
FIG. 2 illustrates selected portions of the exemplary router according to one embodiment of the present invention.

FIG. 2 illustrates selected portions of exemplary router 100 in greater detail according to one embodiment of the present invention. FIG. 2 simplifies the representation of some of the elements in FIG. 1. Router 100 comprises PMD modules 210 and 250, route processing modules 220 and 240, and switch fabric 230. PMD modules 210 and 250 are intended to represent any of PMD modules 111, 121, and 131 shown in FIG. 1. Route processing modules 220 and 240 are intended to represent any of RPM 112, RPM 122, and RPM 132 shown in FIG. 1. Switch fabric 230 is intended to represent crossbar switch 150 and the switch modules in shelves 110, 120 and 130 in FIG. 1.

PMD module 210 comprises physical (PHY) layer circuitry 211, which transmits and receives data packets via the external ports of router 100. PMD module 250 comprises physical (PHY) layer circuitry 251, which transmits and receives data packets via the external ports of router 100. RPM 220 comprises inbound network processor (NP) 221, outbound network processor (NP) 223, and medium access controller (MAC) layer circuitry 225. RPM 240 comprises inbound network processor (NP) 241, outbound network processor (NP) 243, and medium access controller (MAC) layer circuitry 245.

Each network processor comprises a plurality of microengines capable of executing threads (i.e., code) that forward data packets in router 100. Inbound NP 221 comprises N microengines (μEng.) 222 and outbound NP 223 comprises N microengines (μEng.) 224. Similarly, inbound NP 241 comprises N microengines (μEng.) 242 and outbound NP 243 comprises N microengines (μEng.) 244.

Two network processors are used in each route-processing module to achieve high-speed (i.e., 10 Gbps) bi-directional operations. Inbound network processors (e.g., NP 221, NP 241) operate on inbound data (i.e., data packets received from the network interfaces and destined for switch fabric 230). Outbound network processors (e.g., NP 223, NP 243) operate on outbound data (i.e., data packets received from switch fabric 230 and destined for network interfaces).

According to an exemplary embodiment of the present invention, each network processor comprises N=16 microengines that perform data plane operations, such as data packet forwarding. Each RPM also comprises a control plane processor (not shown) that performs control plane operations, such as building forwarding (or look-up) tables. According to the exemplary embodiment, each microengine supports eight threads. At least one microengine is dedicated to reading inbound packets and at least one microengine is dedicated to writing outbound packets. The remaining microengines are used for forwarding table lookup operations.

In order to meet the throughput requirements for line rate forwarding at data rates up to 10 Gbps, it is necessary to split the data plane processing workload among multiple processors, microengines, and threads. The first partitioning splits the workload between two network processors—one operating on inbound data packets from the network interfaces to the switch and the other operating on outbound data packets from the switch to the network interfaces. Each of these processors uses identical copies of the forwarding table.

According to an exemplary embodiment of the present invention, the control and management plane functions (or operations) of router 100 may be distributed between inbound (IB) network processor 221 and outbound network processor 223. The architecture of router 100 allows distribution of the control and management plane functionality among many processors. This provides scalability of the control plane in order to handle higher control traffic loads than traditional routers having only a single control plane processor. Also, distribution of the control and management plane operations permits the use of multiple low-cost processors instead of a single expensive processor. For simplicity in terminology, control plane functions (or operations) and management plane functions (or operations) may hereafter be collectively referred to as control plane functions.

Figure 3:
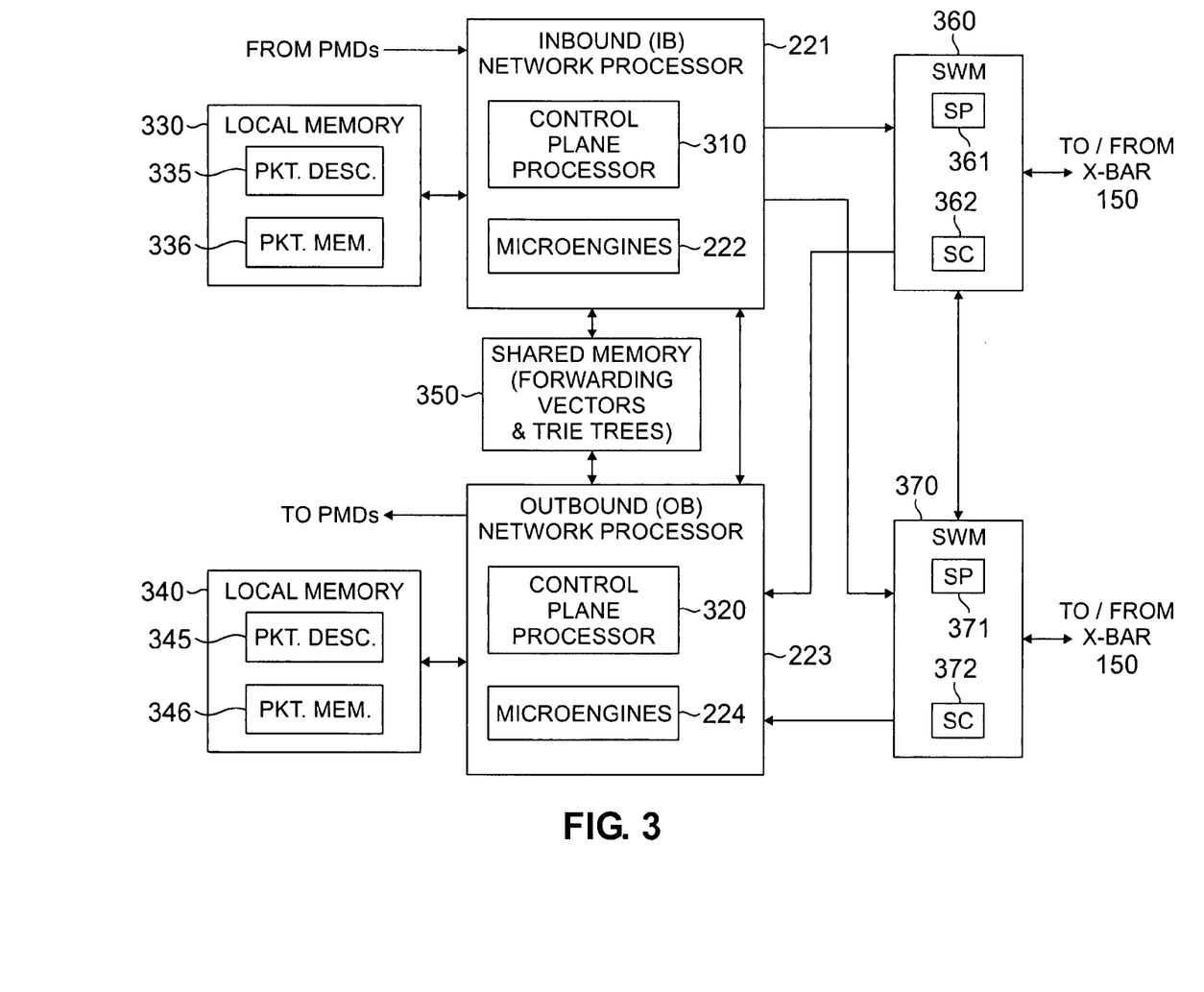
FIG. 3 illustrates the inbound and outbound network processors according to one embodiment of the present invention.

FIG. 3 illustrates inbound network processor 221 and outbound network processor 223 according to an exemplary embodiment of the present invention. Inbound (IB) network processor 221 comprises control plane processor 310 and microengine(s) 222. Outbound (OB) network processor 223 comprises control plane processor 320 and microengine(s) 224. Inbound network processor 221 and outbound network processor 223 are coupled to shared memory 350, which stores forwarding table information, including forwarding vectors and trie tree search tables.

Inbound network processor 221 is coupled to local memory 330, which contains packet descriptors 335 and packet memory 336. Outbound network processor 223 is coupled to local memory 340, which contains packet descriptors 345 and packet memory 346.

Control and management messages may flow between the control and data planes via interfaces between the control plane processors and data plane processors. For example, control plane processor 310 may send control and management messages to the microengines 222 and control plane processor 320 may send control and management messages to the microengines 224. The microengines can deliver these packets to the local network interfaces or to other RPMs for local consumption or transmission on its network interfaces. Also, the microengines may detect and send control and management messages to their associated control plane processor for processing. For example, microengines 222 may send control and management plane messages to control plane processor 310 and microengines 224 may send control and management messages to control plane processor 320.

Inbound network processor 221 operates under the control of control software (not shown) stored in memory 330. Similarly, outbound network processor 223 operates under the control of control software (not shown) stored in memory 340. According to an exemplary embodiment of the present invention, the control software in memories 330 and 340 may be identical software loads.

Network processors 221 and 223 in router 100 share routing information in the form of aggregated routes stored in shared memory 350. Management and routing functions of router 100 are implemented in inbound network processor 221 and outbound network processor 223 in each RPM of router 100. Network processors 221 and 223 are interconnected through 10 Gbps links to exemplary switch module (SWM) 360 and exemplary switch module (SWM) 370. SWM 360 comprises switch processor 361 and switch controller 362. SWM 370 comprises switch processor 371 and switch controller 372. Multiple switch modules may be interconnected through 10 Gbps links via Rack Extension Modules (REXMs) (not shown).

In order to meet the bi-directional 10 Gbps forwarding throughput of the RPMs, two network processors—one inbound and one outbound—are used in each RPM. Inbound network processor 221 handles inbound (IB) packets traveling from the external network interfaces to switch fabric 230. Outbound network processor 223 handles outbound (OB) packets traveling from switch fabric 230 to the external network interfaces. In an exemplary embodiment of the present invention, control plane processor (CPP) 310 comprises an XScale core processor (XCP) and microengines 222 comprise sixteen microengines. Similarly, control plane processor (CPP) 320 comprises an XScale core processor (XCP) and microengines 224 comprise sixteen microengines.

According to an exemplary embodiment of the present invention, router 100 implements a routing table search circuit as described in U.S. patent application Ser. No. 10/794,506, filed on Mar. 5, 2004, entitled "Apparatus and Method for Forwarding Mixed Data Packet Types in a High-Speed Router."The disclosure of U.S. patent application Ser. No. 10/794,506 is hereby incorporated by reference in the present application as if fully set forth herein. The routing table search circuit comprises an initial content addressable memory (CAM) stage followed by multiple trie tree search table stages. The CAM stage allows searches to be performed on data packet header information other than regular address bits, such as, for example, class of service (COS) bits, packet type bits (IPv4, IPv6, MPLS), and the like.

The use of multiple threads in multiple microengines enables network processors 221 and 223 to modify a data packet during its transit through router 100. Thus, network processors 221 and 223 may provide network address translation (NAT) functions that are not present in conventional high-speed routers. This, in turn, provides dynamic address assignment to nodes in a network. Since network processors 221 and 223 are able to modify a data packet, network processors 221 and 223 also are able to obscure the data packet identification. Obscuring packet identification allows router 100 to provide complete anonymity relative to the source of an inbound packet.

The ability of router 100 to distribute the data packet workload over thirty-two microengines, each capable of executing, for example, eight threads, enables router 100 to perform the additional security and classification functions at line rates up to 10 Gbps. FIG. 3 shows the flow of data through route processing module (RPM) 220. Packets enter RPM 220 through an interface—a network interface (PMD) for inbound network processor (IB NP) 221 and a switch interface for outbound network processor (OB NP) 223. IB NP 221 and OB NP 223 also may receive packets from control plane processors 310 and 320.

Microengines 222 store these data packets in packet memory 336 in local QDRAM (or RDRAM) memory 330 and write a Packet Descriptor into packet descriptors 335 in local memory 330. Similarly, microengines 224 store these data packets in packet memory 346 in local QDRAM (or RDRAM) memory 340 and write a Packet Descriptor into packet descriptors 345 in local memory 340.

A CAM search key is built for searching the initial CAM stages of the search tables in memory 350. The CAM key is built from data packet header information, such as portions of the destination address and class of service (CoS) information and a CAM lookup is done. The result of this lookup gives an index for a Vector Table Entry, which points to the start of a trie tree search table. Other information from the packet header, such as the rest of the destination address and possibly a socket address, are used to traverse the trie tree search table.

The search of the CAM stage and trie tree table results in either in a leaf or an invalid entry. Unresolved packets are either dropped or sent to control plane processors 310 and 320 for further processing. A leaf node gives a pointer to an entry in a forwarding table (i.e., a Forwarding Descriptor) in memory 350. Since shared memory space is limited, these forwarding tables may be located in local memory 330 and 340. Based on the results of the search, the packet is forwarded to the control plane, to another RPM network processor, to an L2 module, or to an output port (i.e., a switch port for IB NP 221 and a network interface port for OB NP 223). The data packet is not copied as it is passed from microengine thread to microengine thread. Only the pointer to the Packet Descriptor must be passed internally. This avoids expensive copies.

According to the principles of the present invention, the routing nodes (e.g., RPM 112) in exemplary router 100 share resources and variables through the use of asynchronous (or "async") variables in a field programmable gate array (FPGA) complex associated with shared memory 350. The asynchronous variables allow custom hardware (e.g., FPGA functions) to control access to shared resources without using software semaphores or time-partitioning techniques.

Figure 4:
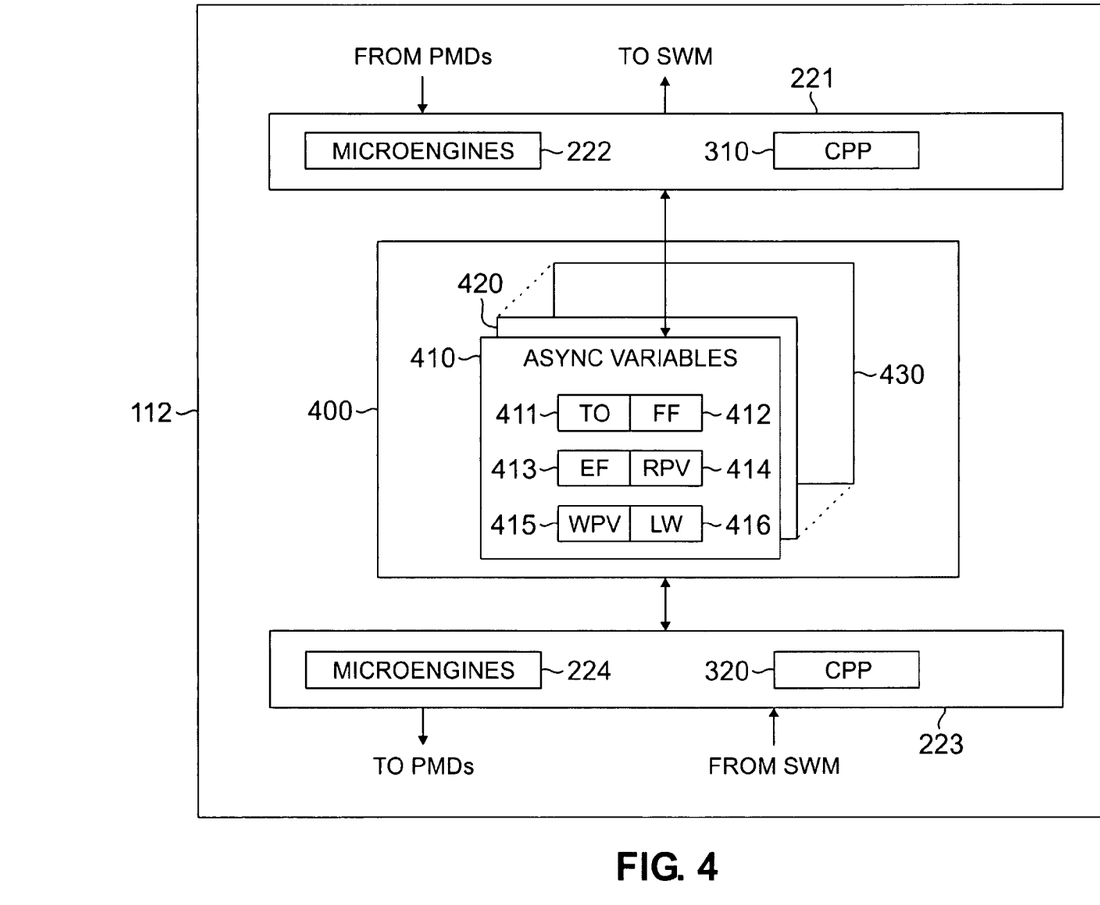
FIG. 4 illustrates a shared memory field programmable gate array in a route processing module for providing asynchronous variables according to the principles of the present invention.

FIG. 4 illustrates shared memory field programmable gate array 400 in route processing module (RPM) 112 for providing asynchronous variables according to the principles of the present invention. As in the case of FIG. 3, route processing module (RPM) 112 comprises inbound (IB) network processor (NP) 221 and outbound (OB) network processor (NP) 223. IB NP 221 comprises microengines 222 and control plane processor (CPP) 310. OB NP 223 comprises microengines 224 and control plane processor (CPP) 320.

IB NP 221 and OB NP 223 are shown coupled to field programmable gate array (FPGA) 400. As noted above, each one of inbound network processor 221 and outbound network processor 223 contains sixteen (16) microengines, so that IB NP 221 and OB NP 223 have thirty-two (32) microengines combined. In an exemplary embodiment of the present invention, FPGA 400 comprises N asynchronous variables blocks, including asynchronous variables blocks 410, 420 and 430. Asynchronous variables blocks 410, 420 and 430 are in memory locations accessible by microengines 222 and 224 and control plane processors 310 and 320. However, access is controlled by hardware in FPGA 400, thus removing the need for software semaphores. Exemplary asynchronous variables block 410 comprises control flags 411-416. Flags 411-416 include a time-out (TO) flag, a full flag (FF), an empty flag (EF), a read protected mode violation (RPV) flag, a write protected mode violation (WPV) flag, and a lock-on-write (LW) flag.

Figure 5:
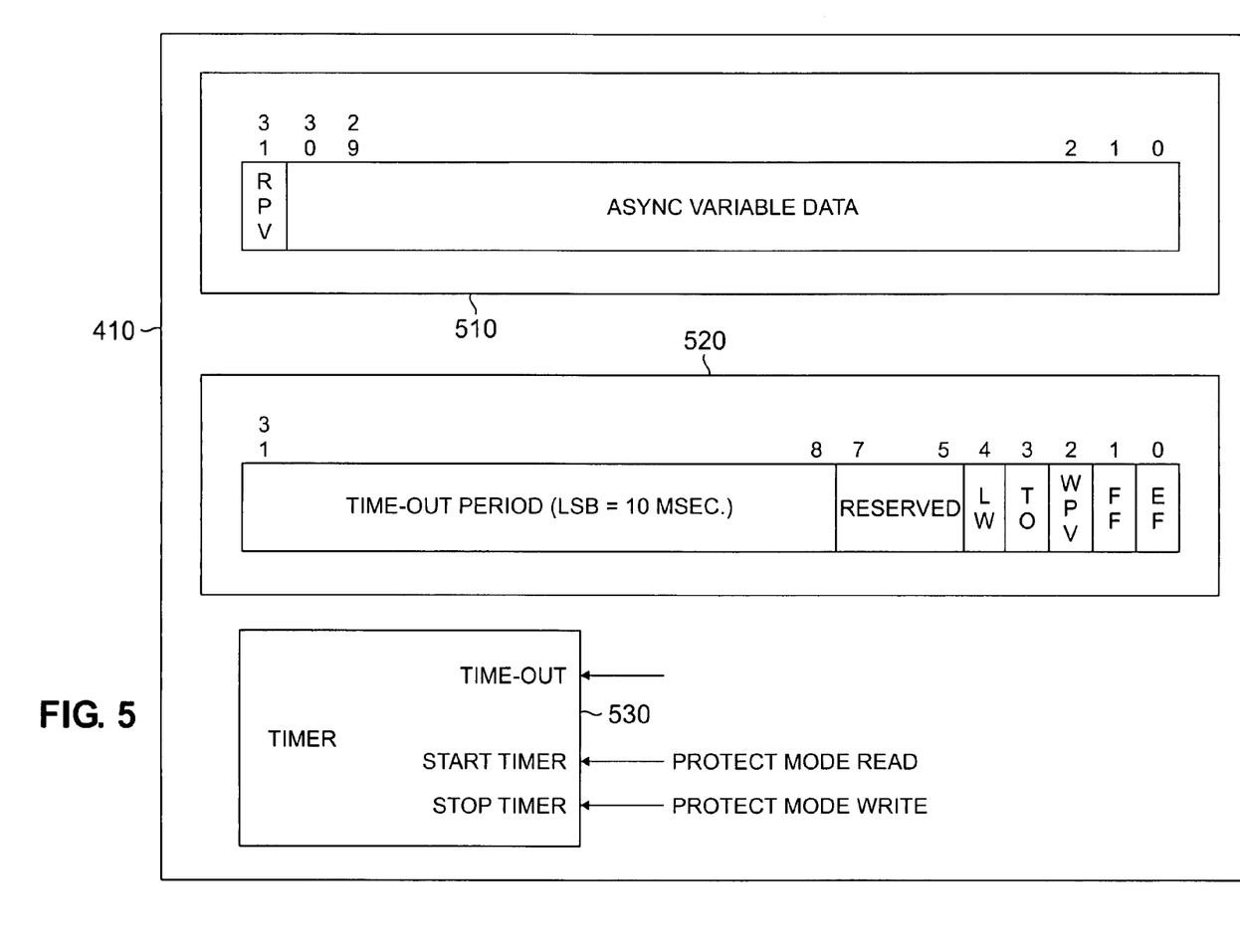
FIG. 5 illustrates the asynchronous variable in FIG. 4 in greater detail according to an exemplary embodiment of the present invention.

FIG. 5 illustrates exemplary asynchronous variables block 410 in greater detail according to an exemplary embodiment of the present invention. Asynchronous variables block 410 comprises register 510, register 520 and timer 530. In the exemplary embodiment of FIG. 5, register 510 is a 32-bit asynchronous variables data register and register 520 is a 32-bit control and status register. Asynchronous variables of various widths may be implemented, but should not exceed the maximum word width of inbound network processor 221 and outbound network processor 223 (e.g., 32 bits) to avoid multiple memory access cycles.

Control and status register 520 contains two control fields, namely a Time-Out Period field and a Lock-on-Write (LW) flag. The Time-Out Period is software programmable and allows recovery from stuck asynchronous variables. The LW flag defines whether the asynchronous variable associated with asynchronous variables block 410 is locked on a read access (the default mode) or on a write access.

Control and status register 520 for each asynchronous variable contains a minimum of three associated flags, namely a time-out flag (TO), a full flag (FF), and an empty flag (EF). These flags do not need to be directly accessible by control software. However, in an exemplary embodiment, control software may directly read the TO flag. The TO flag generally is tied into a software interrupt and is controlled by a mask register and monitored by a status register.

One processor is selected as the management processor for the asynchronous variables. In an exemplary embodiment, the selected processor is CPP 310 of inbound network processor 221. The asynchronous variables management processor is responsible for initializing the asynchronous variables associated with asynchronous variables blocks 410, 420 and 430 and freeing the asynchronous variables that become stuck. Thus, the time-out interrupt is connected to the asynchronous variables management processor.

The full and empty flags are checked and manipulated by hardware in FPGA 400 when control software accesses the asynchronous variables in asynchronous variables blocks 410, 420 and 430. The full and empty flags are not required to be software accessible and preferably are not directly writable by control software. An unprotected write access may set these flags to a predefined state. Other status flags that may be present are protected mode violation flags, namely a read-protected mode violation (RPV) flag and a write-protected mode violation (WPV) flag.

The full and empty flags [FF,EF] support four states: i) uninitialized [00]; ii) empty [01]; iii) full [10], and iv) undefined [11]. The uninitialized state is the state entered when FPGA 400 is reset. When an asynchronous variable is available for a write operation, asynchronous variable is in the empty state and its flags are set to empty and not full. When an asynchronous variable is available for a read operation, the asynchronous variable is in the full state and its flags are set to full and not empty. State machines in FPGA 400 prevent the undefined state of full and empty from occurring.

Each asynchronous variable is mapped to two memory locations for two types of access—protected and unprotected. Protected mode is the normal mode for using these variables. Unprotected mode is available for asynchronous variable initialization and for error recovery.

When a read is attempted in protected mode, FPGA 400 checks the flags. If the asynchronous variable is in the empty or uninitialized state, the read operation fails and control software must attempt access later. If the asynchronous variable is in the full state, FPGA 400 provides the asynchronous variable data from register 510 to the reading processor, clears the full flag, and sets the empty flag.

When a write operation is attempted in protected mode, FPGA 400 checks the flags. If the asynchronous variable is in the full or uninitialized state, the write operation fails and control software must attempt access later. If the asynchronous variable is in the empty state, FPGA 400 writes the asynchronous variable data to register 510, clears the empty flag, and sets the full flag.

When a read operation is attempted in unprotected mode, FPGA 400 provides the asynchronous variable data from register 510 to the processor, and leaves the data and flags unchanged. The states of the flags do not affect this function. This allows a processor to check on asynchronous variable usage without affecting the processes using the asynchronous variable.

When a write operation is attempted in unprotected mode, FPGA 400 writes the asynchronous variable data, sets the full flag, and clears the empty flag. The initial states of the flags do not affect this function. This allows a variable to be initialized to the full state. An unprotected mode write, followed by a protected mode read sets an asynchronous variable into the empty state.

FPGA 400 maintains timer 530 on the locked state of each asynchronous variable that provides an interrupt to the asynchronous variable management processor (e.g., CPP 310 of inbound network processor 221) if the asynchronous variable is locked for more than a software-defined time period (e.g., 20 milliseconds). FPGA 400 provides status information on the cause of the interrupt that can be read by the managing processor and indicates which asynchronous variable timed out. This can be used by the managing processor to free asynchronous variables that become stuck. Timer 530 may be disabled by setting the time-out period to zero.

Control of the asynchronous variable and its associated controlled resource, if present, is gained through a protected-mode read operation and is released through a protected mode-write operation. Depending on the application, it may be desirable to gain control of the asynchronous variable through a protected-mode write and to free it using a protected mode-read. This operational mode is software programmed by the Lock-on-Write (LW) Flag. The main differences between these two modes of operation are which operations start and stop timer 530.

Error indicators for protected mode read and write violations may not be subject to race conditions leading to incorrect usage or stuck asynchronous variables. It is necessary for the protected mode violation indicator to be generated on the same bus access in which the asynchronous variable is read. One approach to this is to return the read protected mode violation (RPV) flag in the data word read operation (e.g., as the most significant bit). This avoids race conditions, but limits the asynchronous variable to one less bit than the word size. In FIG. 5, the read protection mode violation flag is bit 31 in the 32 bit word and the success or failure indication comes with the data. Thus, no race condition occurs.

If all processes follow the procedure of gaining access to the asynchronous variable via read operations before attempting write operations, there is no race condition on write operations. A flag in a status register may be used to verify that there are no write violations. The managing processor may monitor this flag and report the presence of an errant process.

An alternative method uses an extra parity bit to force a parity error when a protected mode violation occurs. This has the advantage of not shortening the size of the asynchronous variable data field by one bit, but requires that the correct processor and process be informed, typically through an interrupt. The parity failure indication must be presented to the processor and process that performed the failed read or write operation.

The data word parity approach is the preferred approach for cases where the processors involved provide data word parity and interrupt support. However, microengines 222 and 224 handling the forwarding processes in router 100 may not support data word parity or interrupts. Therefore, the RPV flag in the read data word in register 510 may be the selected approach.

Figure 6:
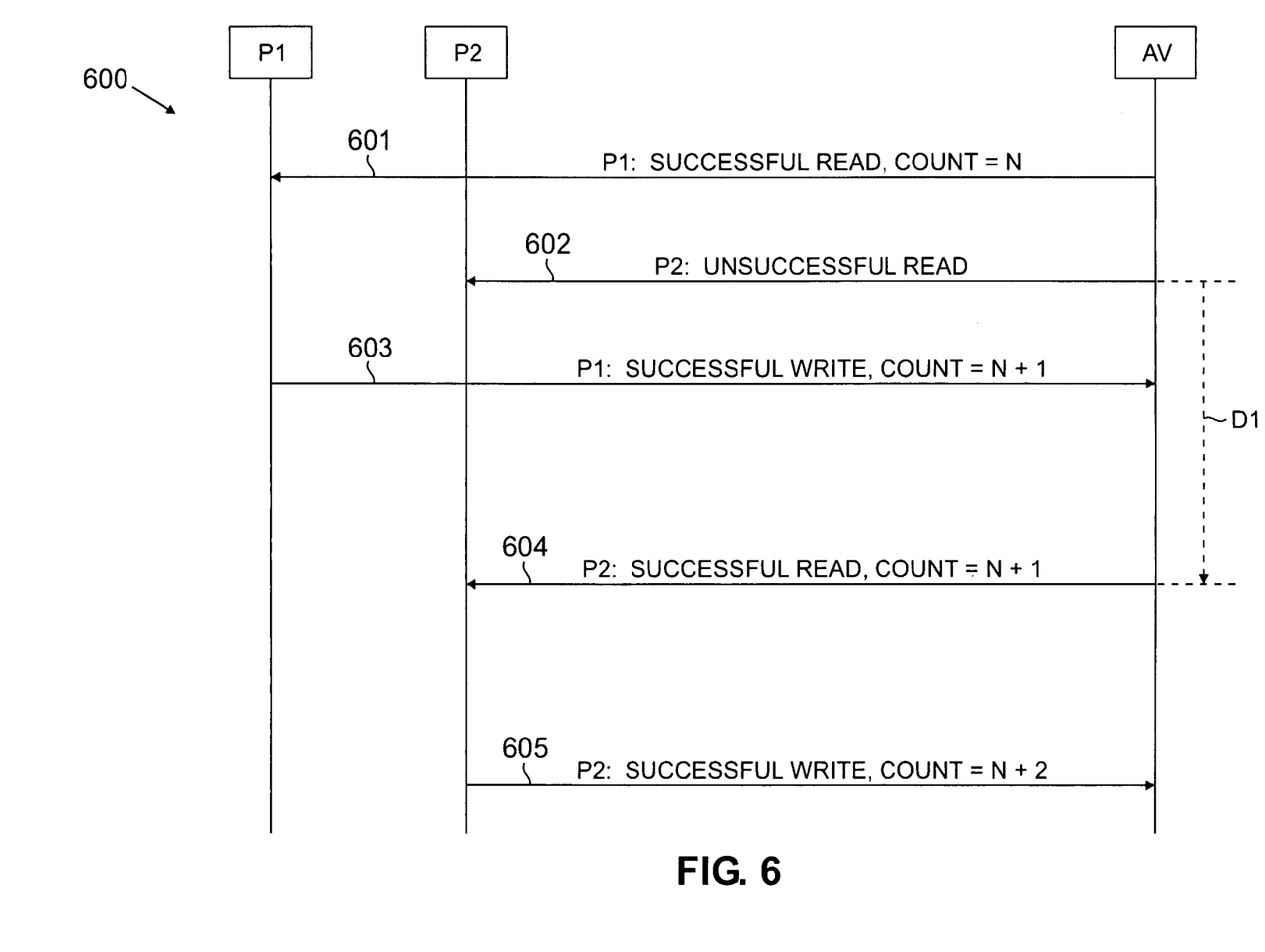
FIG. 6 is a flow diagram illustrating the use of asynchronous variables to count data packets according to an exemplary embodiment of the present invention.

FIG. 6 depicts flow diagram 600, which illustrates the use of asynchronous variables to count data packets according to an exemplary embodiment of the present invention. In this example, the asynchronous variable is the controlled entity, as well as the controlling entity. The packet counter is initialized by the initialization routine to have a zero count and a full state.

At some later point in time, the asynchronous variable contains the count value, Count=N. A first processor (P1) may increment the packet counter asynchronous variable (AV) by reading the variable using a protected mode read (process step 601). If a second processor (P2) attempts to increment the packet counter AV, the read operation of P2 fails due to an empty state (process step 602). Processor P2 then waits for a random length delay (D1) before trying another read operation.

If the processor P1 read operation succeeds, processor P1 adds one to the count read (i.e., N+1) and writes the incremented count back to the packet counter AV in protected mode (process step 603). The read operation in process step 601 left the packet count AV in the empty state, so the write operation will succeed. The write operation leaves the packet counter AV in the full state, thus permitting update by processor P1 or processor P2. At the end of delay D1, processor P2 retries the read operation and successfully reads the count value, Count=N+1 (process step 604). Processor P2 then adds one to the count value (i.e., N+2) and writes the incremented count value back to the packet counter AV in protected mode (process step 605).

To avoid contention in the update, each processor must follow the sequence of a protected mode read operation followed by a protected mode write operation. A processor must do a successful read before it can attempt a write. Otherwise, a read may be done by two processors and the second write will overwrite the first write with the same value and the two processors will increment by a total of one, rather than incrementing by one each.

An asynchronous variable also may be used to control a 64-bit packet length counter. In that case, the asynchronous variable is only the controlling entity. The packet length counter is initialized by the initialization routine to have a zero count and the asynchronous variable is initialized by the initialization routine to be full. This case is similar to the previous case, with a successful protected mode read, followed by a protected mode write. However, in this case, there is a 64-bit counter memory location in memory 350 associated with the asynchronous variable. This is a predefined association known by all of the participating processors, microengines, processes, and threads.

A processor attempts to seize an asynchronous variable by doing a protected mode read to the asynchronous variable. If unsuccessful, the processor tries again after a delay of a random time period. If successful, the processor gains access to the asynchronous variable and proceeds to read the packet length counter, to add the length of the current packet to the stored packet length value, and to write the result back to the packet length counter. Interference in this read-modify-write cycle by other processors is prevented, since the other processors cannot gain access to the asynchronous variable. After writing the result to the packet length counter, the processor writes to the asynchronous variable to free the asynchronous variable for use by other processors.

Although the present invention has been described with an exemplary embodiment, various changes and modifications may be suggested to one skilled in the art. It is intended that the present invention encompass such changes and modifications as fall within the scope of the appended claims.

What is claimed is:

1. A router for transferring data packets between external devices coupled to said router, said router comprising:
    a switch fabric; and
    R routing nodes coupled to said switch fabric, each of said R routing nodes capable of exchanging data packets with said external devices and with other ones of said R routing nodes via said switch fabric, wherein a first of said R routing nodes comprises:
    an inbound network processor comprising a first plurality of micro engines capable of forwarding incoming data packets from external ports to said switch fabric;
    an outbound network processor comprising a second plurality of micro engines forwarding outgoing data packets from said switch fabric to said external ports; and an asynchronous variables circuit for controlling access of said inbound and outbound network processors to at least one of i) a shared resource and ii) a shared variable in said router wherein said asynchronous variables circuit comprises a first register for storing a first data value associated with a first shared variable said control and status bits comprise a full flag and an empty flag indicating whether a state of said first data value in said first register is one of: i) uninitialized; ii) empty; iii) full, and iv) undefined, and said first data value may not be read in a protected mode when said full flag and empty flag indicate that said first data value is in an empty state.

2. The router as set forth in claim 1, wherein said asynchronous variables circuit is implemented in a shared memory structure accessible by said inbound and outbound network processors.

3. The router as set forth in claim 2, wherein said shared memory structure comprises a field programmable gate array.

4. The router as set forth in claim 1, wherein said asynchronous variables circuit further comprises a second register storing control and status bits that control read access and write access to first data value in said first register.

5. The router as set forth in claim 1, wherein said control and status bits comprise a time-out flag and a time-out period value.

6. The router as set forth in claim 1, wherein said control bits comprise a time-out period value.

7. The router as set forth in claim 1, wherein said stats bits comprise a time-out flag.

8. The router as set fort in claim 1, wherein said status bits comprise a time-out period value.

9. A communication network comprising a plurality of routers that communicate data packets to one another and to interfacing external devices, each of said plurality of routers comprising:
a switch fabric; and
R routing nodes coupled to said switch fabric, each of said R routing nodes capable of exchanging data packets with said external devices and with other ones of said R routing nodes via said switch fabric, wherein a first of said R routing nodes comprises:
an inbound network processor comprising a first plurality of micro engines capable of forwarding incoming data packets from external ports to said switch fabric;
an outbound network processor comprising a second plurality of micro engines capable of forwarding outgoing data packets from said switch fabric to said external ports; and an asynchronous variables circuit for controlling access of said inbound and outbound network processors to at least one of i) a shared resource and ii) a shared variable in said router, wherein said asynchronous variables circuit further comprises a second register storing control and status bits that control read access and write access to first data value in a first register, and said control and status bits comprise a full flag and an empty flag indicating whether a state of said first data value in said first register is one of: i) uninitialized; ii) empty; iii) full, and iv) undefined, wherein said first data value may not be read in a protected mode when said full flag and empty flag indicate that said first data value is in an empty state.

10. The communication network as set forth in claim 9, wherein said asynchronous variables circuit is implemented in a shared memory structure accessible by said inbound and outbound network processors.

11. The communication network as set forth in claim 10, wherein said shared memory structure comprises a field programmable gate array.

12. The communication network as set forth in claim 9, wherein said asynchronous variables comprises a first data value associated with a first shared variable.

13. The communication network as set forth in claim 9, wherein said control and status bits comprise a time-out flag and a time-out period value.

14. For use in a router comprising a plurality of routing nodes, wherein a first routing node comprises: i) an inbound network processor that forwards incoming data packets from external ports to a switch fabric, and ii) an outbound network processor that forwards outgoing data packets from the switch fabric to the external ports, a method of controlling access to resources and variables shared by the inbound and outbound network processors, the method comprising the steps of:
reading a first data value from an asynchronous variables circuit that controls access to at least one of i) a shared resource and ii) a shared variable in said router; and
setting at least one control/status bit that controls read access and write access to the first data value in asynchronous variables circuit, wherein the at least one control/status bit comprises a full flag and an empty flag indicating whether a state of the first data value, and wherein the first data value may not be read in a protected mode when the full flag and the empty flag indicate that the first data value is in an empty state wherein the full flag and the empty flag indicate whether a state of the first data value is one of: i) uninitialized; ii) empty; iii) full, and iv) undefined and the inbound network processor comprises a plurality of microengines.

15. The method as set forth in claim 14, wherein the first data value may not be written in a protected mode when the full flag and empty flag indicate that the first data value is in a full state.

16. The method as set forth in claim 14, wherein said control bits comprise a time-out flag.

17. The method as set forth in claim 14, wherein said control bits comprise a time-out period value.

18. The method as set forth in claim 14, wherein said status bits comprise a time-out flag.

19. The method as set forth in claim 14, wherein said status bits comprise a time-out period value.

20. The router as set forth in claim 1, wherein said control bits comprise a time-out flag.

* * * * *